United States Patent
Zhou et al.

(10) Patent No.: US 8,933,672 B2
(45) Date of Patent: Jan. 13, 2015

(54) CHARGING MANAGEMENT METHOD AND APPARATUS FOR STORAGE BATTERY

(75) Inventors: Baohang Zhou, Guangdong (CN); Mingming Liu, Guangdong (CN); Yanni Meng, Guangdong (CN); Lingqiao Teng, Guangdong (CN); Shuwang Wei, Guangdong (CN)

(73) Assignee: ZTE Corporation, Shenzhen (CN)

(*) Notice: Subject to any disclaimer, the term of this patent is extended or adjusted under 35 U.S.C. 154(b) by 378 days.

(21) Appl. No.: 13/504,337

(22) PCT Filed: Apr. 22, 2010

(86) PCT No.: PCT/CN2010/072064
§ 371 (c)(1),
(2), (4) Date: Apr. 26, 2012

(87) PCT Pub. No.: WO2010/145317
PCT Pub. Date: Dec. 23, 2010

(65) Prior Publication Data
US 2012/0217934 A1      Aug. 30, 2012

(30) Foreign Application Priority Data

Oct. 27, 2009  (CN) .......................... 2009 1 0206662

(51) Int. Cl.
H02J 7/00        (2006.01)
H01M 10/44   (2006.01)

(52) U.S. Cl.
CPC ............... *H01M 10/44* (2013.01); *Y02E 60/12* (2013.01)
USPC .......................................................... 320/136

(58) Field of Classification Search
CPC ................................ H01M 10/44; Y02E 60/12
USPC ............................................ 320/127, 135, 136
See application file for complete search history.

(56) References Cited

U.S. PATENT DOCUMENTS

| 4,553,081 | A | * | 11/1985 | Koenck .......................... 320/131 |
| 5,889,386 | A | * | 3/1999 | Koenck .......................... 320/136 |
| 6,523,626 | B2 | | 2/2003 | Wakashiro et al. |
| 2001/0042648 | A1 | | 11/2001 | Wakashiro et al. |
| 2004/0257044 | A1 | | 12/2004 | Nagaoka |
| 2005/0046393 | A1 | | 3/2005 | Nakasho et al. |

FOREIGN PATENT DOCUMENTS

| CN | 1324735 A | 12/2001 |
| CN | 1481059 A | 3/2004 |

(Continued)

*Primary Examiner* — Vuthe Siek
(74) *Attorney, Agent, or Firm* — Christopher L. Parmelee; Walker & Jocke (57) ABSTRACT

In order to reasonably adjust charging current of a storage battery according to temperature, realize quick, safe and reliable charging of the storage battery, and effectively prolong the service life of the storage battery, the present invention provides a charging management method and apparatus for a storage battery. The method comprises the following steps: monitoring discharge capacity of a storage battery, and determining discharge depth of the storage battery according to the discharge capacity and total capacity of the storage battery; comparing the discharge depth of the storage battery with a preset battery equalizing charging threshold; and when the discharge depth of the storage battery is greater than or equal to the preset battery equalizing charging threshold capacity, actuating a temperature-control charging mode to charge the storage battery, wherein the temperature-control charging mode is to adjust charging current according to the temperature of the battery.

14 Claims, 5 Drawing Sheets

(56) References Cited

FOREIGN PATENT DOCUMENTS

| | | |
|---|---|---|
| CN | 1251899 C | 4/2006 |
| CN | 1889323 A | 1/2007 |
| CN | 101312293 A | 11/2008 |
| CN | 101404347 A | 4/2009 |
| JP | 2004364445 A | 12/2004 |

* cited by examiner

CHARGING MANAGEMENT METHOD AND APPARATUS FOR STORAGE BATTERY

FIELD OF THE INVENTION

The present invention relates to the storage battery field, in particular to a charging management method and apparatus for a storage battery.

BACKGROUND OF THE INVENTION

With the rapid development of the communication industry in recent years, facilities such as trunk fiber optic cables, microwave unmanned stations and mobile base stations have been built successively, and a large quantity of storage battery packs are used in these facilities. Storage battery has high cost and accounts for a large proportion of the investment, so the storage battery should be correctly used and reasonably maintained to avoid battery capacity, service life and number of times of charge/discharge from being incapable of reaching the nominal criteria, thus it is crucial to perform scientific charging management for the storage battery.

Usually, the storage battery needs to be recharged after it is used, to recover its battery capacity, in order to supply power when the commercial power is powered off accidentally. The charging of the storage battery is realized by a switching power supply, therefore, whether the charging management method for the switching power supply is good or not will directly influence the battery capacity and service life of the storage battery.

There are two modes for the switching power supply to charge the storage battery. One mode is an floating charging mode wherein the charging voltage is 2.23V-2.25V per one cell, for some storage batteries used for communication, and a charging voltage is applied on the storage battery which has been charged to generate a tiny charging current, the function thereof is to compensate the power consumption caused by the self-discharge of the storage battery, so that the storage battery can stably keep its battery capacity. The other charging mode is an equalizing charging mode, in which the charging voltage is 2.35V per one cell for some storage batteries used for communication, and the rapid charging is performed on the discharged storage battery in order to supplement power to the discharged storage battery in time. In order not to damage the service life of the storage battery, the equalizing charging is usually needed in the following cases: for example, when the installation of the new storage battery system is completed, it needs to use the equalizing charging mode to charge the storage battery packs; if being not used for a period of time, it needs to use the equalizing charging mode to charge the storage battery; when charging in the floating charging mode for a period of time, it needs to use the equalizing charging mode to charge the storage battery; after being deeply discharged, it needs to use the equalizing charging mode to charge the storage battery.

At present, in the charging management for the storage battery, there are many modes to equalizing charge the storage battery, mainly comprising: constant-current charging method, two-stage charging method and constant-voltage charging method. The constant-current charging method means that the charging current is kept at a constant value during the charging of the storage battery, and has the disadvantage as follows: at the late stage of charging, the charging current is mostly used for electrolyzing water and a large amount of hydrogen and oxygen is generated, and only a small part of these gases can be chemically recombined to water, and as a result, the interior pressure of the storage battery is increased, such that the gas exhaust valve is open, which makes the battery loses water. The constant-voltage charging method means that the charging voltage is kept at a constant value during the charging of the storage battery, and has the disadvantage as follows: at the early stage of charging, the charging current is very large, and as a result, the lead sulfate attached to the battery plate is easy to fall off, which will form irreversible vulcanization, which greatly influences the battery capacity and the service life of the storage battery. In the worse situation, excessive charging current can easily make the pole plate of the battery bent and further make the battery scrapped. The two-stage charging method is a quick charging method combining the constant-current charging method and the constant-voltage charging method together. In this method, a constant current is first used to charge the storage battery to have the storage battery being at the predetermined voltage value, and then the constant-voltage charging method is used to complete the rest charging of the storage battery. The disadvantage of this method is that, the constant current first used is also relatively large, which also can easily make the lead sulfate attached to the battery plate fall off, forming irreversible vulcanization and influencing the service life. In addition, during the charging process using these methods, with the charging progresses, particularly in a case of charging with a large current, the temperature of the storage battery rises gradually, and the rising temperature will aggravate the corrosion of the pole plate of the battery and consume water in the storage battery, and as a result, the service life of the storage battery is shortened, the battery capacity is decreased, and even the storage battery is damaged.

Therefore, how to realize the charging of the storage battery quickly and safely becomes a problem to be solved.

SUMMARY OF THE INVENTION

The present invention provides a charging management method and apparatus for a storage battery to solve at least one of the above problems.

The present invention provides a charging management method for a storage battery, which comprises the following steps: monitoring discharge capacity of a storage battery, and determining discharge depth of the storage battery according to the discharge capacity and total capacity of the storage battery; comparing the discharge depth of the storage battery with a preset battery equalizing charging threshold; and when the discharge depth of the storage battery is greater than or equal to the preset battery equalizing charging threshold, actuating a temperature-control charging mode to charge the storage battery, wherein the temperature-control charging mode is to adjust charging current according to the temperature of the battery.

In the above, before actuating a temperature-control charging mode to charge the storage battery, the method further comprises: actuating a constant-current charging mode to charge the storage battery, wherein the charging current of the constant-current charging mode is determined according to the discharge depth.

In the above, after actuating a temperature-control charging mode to charge the storage battery, the method further comprises: when the voltage of the storage battery reaches a preset equalizing charging voltage value, actuating a constant-voltage charging mode to charge the storage battery.

In the above, in actuating a temperature-control charging mode to charge the storage battery: when the temperature of the storage battery is less than or equal to T, the value of the charging current is $C*C_{oef}$; when the temperature of the storage battery is greater than T and less than or equal to $$\frac{C_{oef}}{2BatCoef} + T,$$

the value of the charging current is $C*C_{oef}-C*(t_{bat}-T)*BatCoef$; when the temperature of the storage battery is greater than or equal to $$\frac{C_{oef}}{2BatCoef} + T,$$

the value of the charging current is $0.5\ C_{oef}*C$; wherein, T is reference temperature, $t_{bat}$ is the temperature of the storage battery, $C_{oef}$ is charging current ratio, C is the total capacity of the storage battery, and BatCoef is temperature compensation coefficient of the charging current ratio.

In the above, determining the charging current of the constant-current charging mode according to the discharge depth comprises: acquiring a charging current ratio adjustable factor corresponding to the discharge depth from a pre-saved corresponding relation between discharge depth and the charging current ratio adjustable factor; acquiring the automatically turned-down charging current $C*C_{oef}-C*\Delta C_{oef}$; wherein, $C_{oef}$ is the charging current ratio, C is the total capacity of the storage battery, and $\Delta C_{oef}$ is the charging current ratio adjustable factor.

In the above, after comparing the discharge depth of the storage battery with a preset battery equalizing charging threshold capacity, the method further comprises: when the discharge depth of the storage battery is less than the preset battery equalizing charging threshold capacity, actuating a floating charging mode to charge the storage battery.

The present invention also provides a charging management apparatus for a storage battery, which comprises: a monitoring unit, which is configured to monitor discharge capacity of a storage battery, and determine discharge depth of the storage battery according to the discharge capacity and total capacity of the storage battery; a comparison unit, which is configured to compare the discharge depth of the storage battery determined by the monitoring unit with a preset battery equalizing charging threshold; and an adjustment unit, which is configured to actuate a temperature-control charging mode to charge the storage battery when the discharge depth of the storage battery is greater than or equal to the preset battery equalizing charging threshold, wherein the temperature-control charging mode is to adjust charging current according to the temperature of the battery.

In the above, before actuating a temperature-control charging mode to charge the storage battery, the adjustment unit is further configured to actuate a constant-current charging mode, and determine the charging current of the constant-current charging mode according to the discharge depth to charge the storage battery.

In the above, after actuating a temperature-control charging mode to charge the storage battery, the adjustment unit is further configured to actuate a constant-voltage charging mode to charge the storage battery when the voltage of the storage battery reaches a preset equalizing charging voltage value.

In the above, after comparing the discharge depth of the storage battery with the preset battery equalizing charging threshold capacity, the adjustment unit is further configured to actuate a floating charging mode to charge the storage battery when the discharge depth of the storage battery is less than the preset battery equalizing charging threshold capacity.

In the charging management method and apparatus for a storage battery provided by the present invention, a staged charging method is employed, in which by using a temperature-control charging mode to charge the storage battery under the situation that the discharge depth of the storage battery is relatively great, the problem that the temperature of the storage battery is too high due to the excessive current at the early stage of charging is avoided, so the service life of the storage battery is prolonged, and the investment cost of user is reduced.

BRIEF DESCRIPTION OF THE DRAWINGS

The drawings illustrated here provide further understanding of the present invention and form a part of the present invention. The exemplary embodiments of the present invention and the description thereof are used to explain the present invention without unduly limiting the scope of the present invention. In the drawings.

DETAILED DESCRIPTION OF THE EMBODIMENTS

The charging management method for a storage battery proposed by the present invention belongs to the equalizing charging method, and it can be called a staged charging method. The technical solution of the present invention will be described in detail hereinafter with reference to the drawings.

Figure 1:
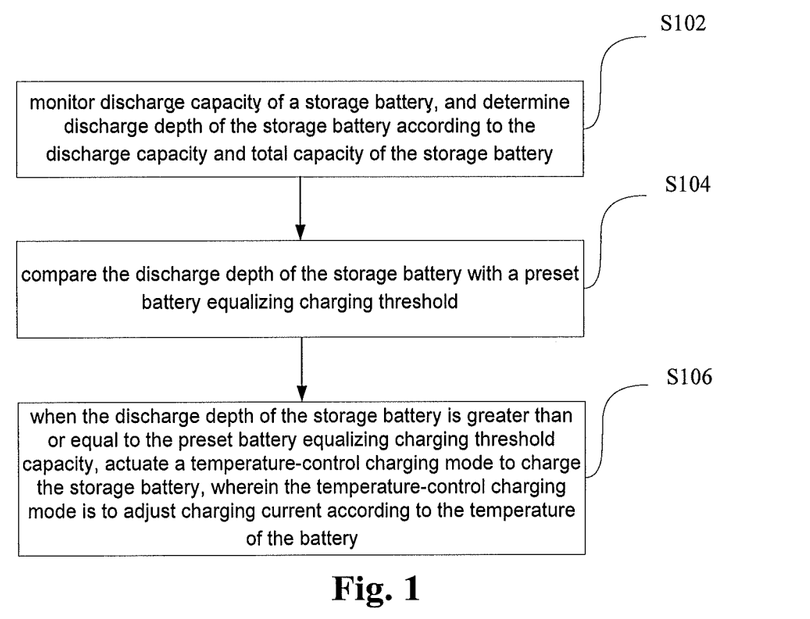
FIG. 1 is a flow chart of a charging management method of an embodiment of the present invention.

FIG. 1 is a flow chart of a charging management method according to an embodiment of the present invention, and the method comprises:

S102: monitoring discharge capacity of a storage battery, and determining discharge depth of the storage battery according to the discharge capacity and total capacity of the storage battery;

S104: comparing the discharge depth of the storage battery with a preset battery equalizing charging threshold; and S106: when the discharge depth of the storage battery is greater than or equal to the preset battery equalizing charging threshold capacity, actuating a temperature-control charging mode to charge the storage battery, wherein the temperature-control charging mode is to adjust charging current according to the temperature of the battery.

In this embodiment, under the situation that the discharge depth of the storage battery is relatively great, a temperature-control charging mode is used to charge the storage battery, thus avoiding the problem that the temperature of the storage battery is too high due to the excessive current when the remaining capacity of the battery is relatively low, so the service life of the storage battery is prolonged.

Preferably, before a temperature-control charging mode is actuated to charge the storage battery, a constant-current charging mode is actuated to charge the storage battery, wherein the charging current in the constant-current charging mode is determined according to the discharge depth.

At the early stage of charging, a turned-down charging current is used for constant-current charging, thus avoiding the problem that the lead sulfate attached to the battery plate falls off due to the relatively large charging current at the early stage of charging, so the damage of the storage battery is reduced.

Preferably, after a temperature-control charging mode is actuated to charge the storage battery, when the voltage of the storage battery reaches a preset equalizing charging voltage value, a constant-voltage charging mode is actuated to charge the storage battery.

At the late stage of charging, current is mostly used for electrolyzing water when the constant-current charging mode is used, which makes the interior pressure of the storage battery too high, thus the battery loses water. In this embodiment, at the late stage of charging, a constant-voltage charging mode is actuated to charge the storage battery, therefore the above problem is avoided, and the stability of the charging of the storage battery is improved.

Preferably, in actuating a temperature-control charging mode to charge the storage battery: when the temperature of the storage battery is less than or equal to T, the value of the charging current is $C*C_{oef}$; when the temperature of the storage battery is greater than T and less than or equal to $$\frac{C_{oef}}{2BatCoef} + T,$$

the value of the charging current is $C*C_{oef}-C*(t_{bat}-T)*BatCoef$; when the temperature of the storage battery is greater than or equal to $$\frac{C_{oef}}{2BatCoef} + T,$$

the value of the charging current is $0.5 C_{oef}*C$; wherein T is a preset reference temperature, $t_{bat}$ is the temperature of the storage battery, $C_{oef}$ is charging current ratio, C is the total capacity of the storage battery, and BatCoef is the temperature compensation coefficient of the charging current ratio.

The corresponding relation between the temperature and the charging current is provided in the embodiment, so the practicability of the embodiment is enhanced.

Preferably, determining the charging current of the constant-current charging mode according to the discharge depth comprises: acquiring a charging current ratio adjustable factor corresponding to the discharge depth from a pre-saved corresponding relation between the depth of discharge and charging current ratio adjustable factor; acquiring the automatically turned-down charging current $C*C_{oef}-C*\Delta C_{oef}$; wherein, $C_{oef}$ is the charging current ratio, C is the total capacity of the storage battery, and $\Delta C_{oef}$ is the charging current ratio adjustable factor.

The charging current ratio adjustable factor is a common parameter to describe the charging current. In this embodiment, the discharge depth is made to correspond to the charging current ratio adjustable factor, which can meet the applications in most scenes.

Preferably, when the discharge depth is less than the preset battery equalizing charging threshold capacity, a floating charging mode is actuated to charge the storage battery.

In the embodiment, under the situation that the discharge depth is small, a floating charging mode is actuated, so the power consumption caused by the self-discharge of the storage battery can be compensated, thus the storage battery can be stably kept at its battery capacity.

Figure 2:
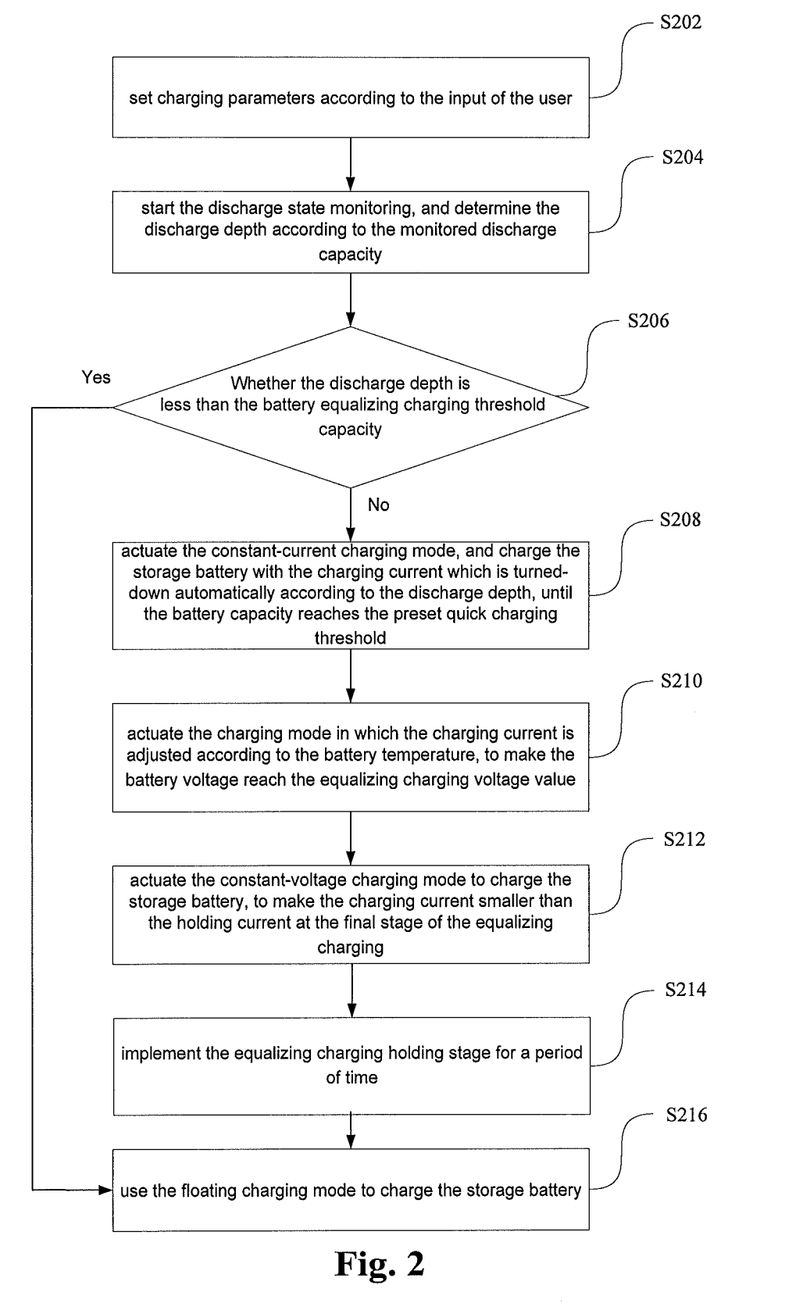
FIG. 2 is a specific flow chart of a charging management method of an embodiment of the present invention.
Figure 3:
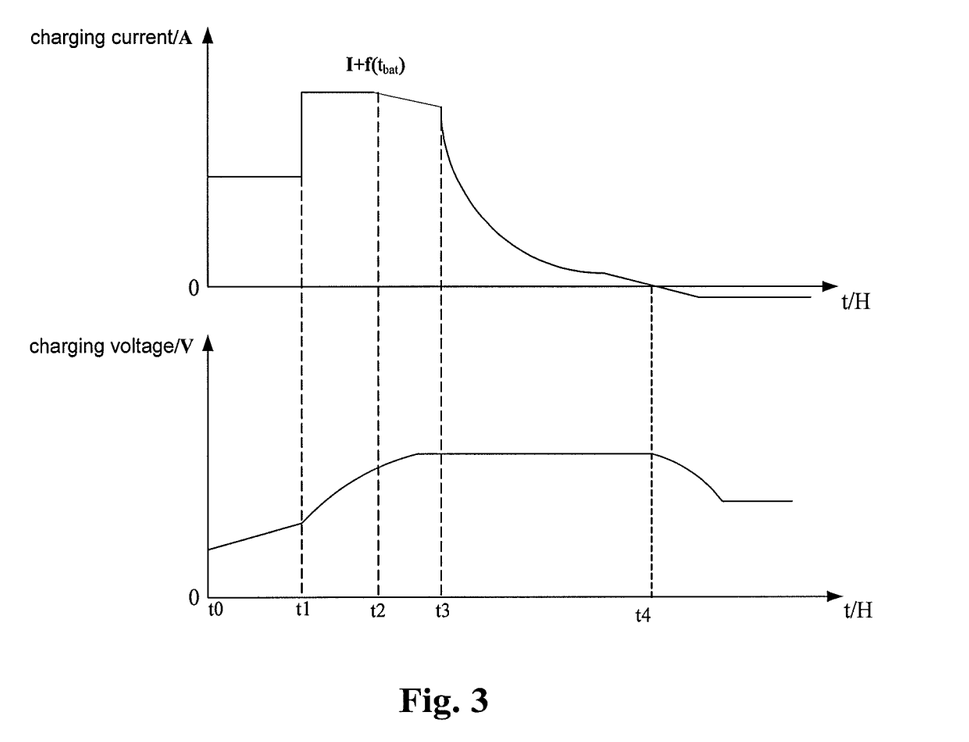
FIG. 3 is a schematic diagram of a charging curve of a charging management method of an embodiment of the present invention.

FIG. 2 is a specific flow chart of a charging management method of an embodiment of the present invention; and FIG. 3 is a schematic diagram of a charging curve of a charging management method of an embodiment of the present invention, respectively shows the change of the charging current over time and the change of the battery voltage over time. The charging management method of the present invention, i.e., the implementation flow of a staged charging method, will be described hereinafter with reference to FIG. 2 and in conjunction with the curves in FIG. 3 which respectively show the change of the charging current and the change of the charging voltage over time.

S202: The charging parameters of the storage battery are set according to the input of the user. The above parameters comprise a charging current ratio, a temperature compensation coefficient of the charging current ratio, a reference temperature, an equalizing charging voltage, a floating charging voltage, a battery equalizing charging threshold capacity, a quick charging threshold, the current ratio at the final stage of equalizing charging and etc. The range of these parameters is usually provided by the storage battery manufacturer, and the user selects one proper value within the provided range of the parameters to set the parameter.

S204: After the commercial power is powered off, the storage battery starts to be discharged, and the discharge state monitoring of the battery is started simultaneously, wherein main parameters for the monitoring comprise: discharge capacity of the battery, battery voltage, battery current and battery temperature, and the discharge depth of the battery is determined according to the recorded discharge capacity of the battery.

The discharge depth is determined according to the discharge capacity and the total capacity of the storage battery, and the discharge depth is a ratio of the quantity of the discharged electricity to the total capacity of the storage battery. When the storage battery is discharged, the capacity of the storage battery is directly reflected by the voltage thereof, therefore the change of the capacity of the storage battery can also be known through the change of the voltage of the storage battery.

S206: After the commercial power is recovered, it is switched to the commercial power which provides electricity for loads, and the storage battery stops discharging and starts to be charged to supplement the consumed electricity.

The discharge depth of the storage battery is compared with the preset battery equalizing charging threshold capacity, if the discharge depth of the storage battery is less than the battery equalizing charging threshold capacity, it turns to S216; otherwise, the staged charging method is actuated to charge the storage battery.

The value of the above battery equalizing charging threshold capacity can be set around 20%. When the discharge depth of the storage battery is less than the battery equalizing charging threshold capacity, it is indicated that the quantity of electricity discharged in the powering process is small, and supplement of the power of the storage battery can be achieved just through the floating charging mode. The charging current of the floating charging mode is small, which is suitable for the non-deep discharge situation with small quantity of discharged electricity, and also suitable for compensation of the power consumption caused by the self-discharge of the storage battery.

S208: The constant-current charging mode is actuated, the charging current is turned-down automatically according to the discharge depth, and the storage battery is charged slowly until the battery capacity reaches the preset quick charging threshold.

The method for automatically turning down the charging current according to the discharge depth is as follows: the corresponding relation between the discharge depth and the charging current ratio adjustable factor is saved in the charging management apparatus for the storage battery in advance, and from the corresponding relation, the charging current ratio adjustable factor corresponding to the discharge depth of the storage battery can be acquired. The turned-down charging current also can be acquired in other ways, for example, the turned-down charging current value is set by the user in advance.

The automatically turned-down charging current value is a current value determined by automatically turning down the value of the charging current ratio of the storage battery by a certain amount based on the preset value thereof according to the discharge depth. It can be represented as a difference value between the charging current determined according to the preset charging current ratio and the current adjustment amount determined according to the charging current ratio adjustable factor. It can be expressed by the following formula:

$$I_{small\ current}=C*C_{oef}-C*\Delta C_{oef}$$

wherein, $I_{small\ current}$ is the automatically turned-down charging current value, C is the total capacity of the storage battery, $C_{oef}$ is the charging current ratio, and $\Delta C_{oef}$ is the charging current ratio adjustable factor; $C_{oef}*C$ is the charging current determined according to the preset charging current ratio, which is also called current limiting value, namely, $I_{current\ limiting\ value}=C_{oef}*C$; $C*\Delta C_{oef}$ is the current adjustment amount determined according to the charging current ratio adjustable factor, namely, $I_{adjustment\ amount}=C*\Delta C_{oef}$ therefore, the automatically turned-down charging current value also may be expressed as:

$$I_{small\ current}=I_{current\ limiting\ value}-I_{adjustment\ amount}.$$

The function of the small-current constant-current charging mode is shown in the curve corresponding to a period of time from t0 to t1 in FIG. 2. The current for charging the storage battery is the automatically turned-down charging current value, which is relatively small. With the charging process going on, the battery voltage of the storage battery rises gradually but slowly.

The function of charging the storage battery with the low-current constant-current charging mode is mainly to prevent the lead sulfate attached to the battery plate from falling off after the discharge to form irreversible vulcanization, which can influence the service life of the battery. When the battery capacity reaches the preset quick charging threshold, it is indicated that the lead sulfate on the surface of the battery plate has been reduced, and at this time a relatively large current can be used for charging, which will not cause any damage to the device.

S210: The temperature-control charging mode in which the charging current is adjusted according to the temperature of the battery is actuated, and a relatively large current is used to charge the storage battery. When the battery voltage rises to the preset equalizing charging voltage value, it implements S212.

Adjusting the charging current according to the temperature of the battery to charge the storage battery is implemented as follows: first, the monitored temperature of the battery is compared with the preset reference temperature, if the monitored temperature of the battery is lower than or equal to the preset reference temperature of the battery, the storage battery is charged with the charging current at the current limiting value, which can be represented as:

$$\text{if } t_{bat} \leq T, I=I_{current\ limiting\ value}=C*C_{oef},$$

wherein, $t_{bat}$ is the temperature of the storage battery, and I is the charging current.

When the monitored temperature of the battery is greater than the reference temperature, the charging current for charging the storage battery is determined by the following formula:

$$I=C*NC_{oef}=C*(C_{oef}-\Delta C_{oef}),$$

wherein, $NC_{oef}$ is the actual charging current ratio, which is the difference value between the preset charging current ratio and the charging current ratio adjustable factor when the charging is performed with the large current; $\Delta C_{oef}$ is the charging current ratio adjustable factor when the charging is performed with the large current.

The charging current ratio adjustable factor when the charging is performed with the large current is determined by the following formula:

$$\Delta C_{oef}=(t_{bat}-T)*\text{BatCoef},$$

wherein, BatCoef is the temperature compensation coefficient of battery charging current ratio. When the monitored temperature of the battery allows $\Delta C_{oef}>0.5*C_{oef}$, namely, when $$t_{bat} > \frac{C_{oef}}{2BatCoef} + T,$$

then it is prescribed that:

$$\Delta C_{oef}=0.5*C_{oef}.$$

Therefore, when $$T < t_{bat} \leq \frac{C_{oef}}{2BatCoef} + T,$$

the charging current is:

$$I=C_{oef}*C-(t_{bat}-T)*\text{BatCoef}*C.$$

While when $$t_{bat} > \frac{C_{oef}}{2BatCoef} + T,$$

the charging current is:

$$I=I_{min}=0.5\ C_{oef}*C,$$

wherein, $I_{min}$ is the minimum value of the current limiting value.

The adjustment amount of the current also may be defined as $f(t_{bat})=\Delta C_{oef}*C_{oef}$, then I also may be expressed as:

$$I=I_{current\ limiting\ value}+f(t_{bat}).$$

The coefficient 0.5 in Formula $\Delta C_{oef} > 0.5*C_{oef}$ is a preferred value, and this coefficient also may be set as other proper values.

When the temperature of the storage battery is less than the preset reference temperature of the battery, the storage battery is charged with the constant current limiting value $I_{current\ limiting\ value}$; with the charging progressing, when the temperature of the storage battery is greater than the preset reference temperature of the battery, the charging current becomes smaller as the temperature rises, to prevent the temperature from rising too fast; when the battery temperature of the storage battery rises to a certain value, the storage battery is charged with the minimum value of the current limiting value $I_{min}$. During the charging process, the following situations may also occur: if the battery temperature is always lower than the reference temperature, then the battery is always charged with the charging current $I=I_{current\ limiting\ value}$; or, the battery temperature only rises to a value between T and $$\frac{C_{oef}}{2BatCoef} + T,$$

the battery is charged with the charging current $I=I_{current\ limiting\ value}$ first and then charged with the charging current $I=C_{oef}*C-(t_{bat}-T)*BatCoef*C$; or, the battery temperature is kept at a dynamic balance near the reference temperature, or the like. The function of the temperature-control charging mode is shown in the curve corresponding to a period of time from t1 to t3 in FIG. 2. In the drawing, the storage battery is charged with $I=I_{current\ limiting\ value}$ first, and since t2, the storage battery is then charged with $I=C_{oef}*C-(t_{bat}-T)*BatCoef*C$.

The introduction of the temperature adjustment into the quick charging of the storage battery with relatively large current may prevent the temperature of the battery from rising too high due to the large current, which protects the battery.

S212: The constant-voltage charging mode is actuated to charge the storage battery, and after a period of time, the charging current is lower than the holding current at the final stage of the equalizing charging.

The stage of charging the storage battery using the constant-voltage charging mode is called battery charge absorption stage. With the charging going on, the conversion efficiency of electrical energy decreases accordingly which presents approximate exponential law. When the storage battery is nearly fully-charged and the battery voltage reaches or exceeds the floating charging voltage, if being still charged with the large current, only a small part of electrical energy is converted into chemical energy, and all the remaining energy is consumed by heating or electrolysis of water, and as a result, the battery may have bulge deformation and even crack. Therefore, the constant-voltage charging mode is used instead to charge the storage battery with an equalizing charging voltage, wherein the charging current for the storage battery is very small, the equalizing charging will end automatically after the equalizing charging state holds for another period of time. The duration of the holding period can be set according to the performance of the storage battery.

The holding current at the final stage of the equalizing charging is acquired according to the product of the preset current ratio at the final stage of the equalizing charging and the total capacity of the storage battery. The user can set a proper current ratio at the final stage of the equalizing charging according to the type of the storage battery to determine the holding current at the final stage of the equalizing charging.

The function of the temperature-control charging mode is shown in the curve corresponding to a period of time from t3 to t4 in FIG. 2, and as shown by the curve, the battery voltage of the storage battery is kept constant, and the charging current for the storage battery decreases in approximate exponential law.

S214: The equalizing charging holding stage is entered, and after a period of time, it implements S216.

S216: Switching to the floating charging mode, the capacity of the storage battery is kept stable.

After the equalizing charging ends, the storage battery is charged in the floating charging mode, the function of which is to compensate the electricity consumption caused by the self-discharge of the storage battery, so the storage battery can be stably kept at its battery capacity.

Figure 4:
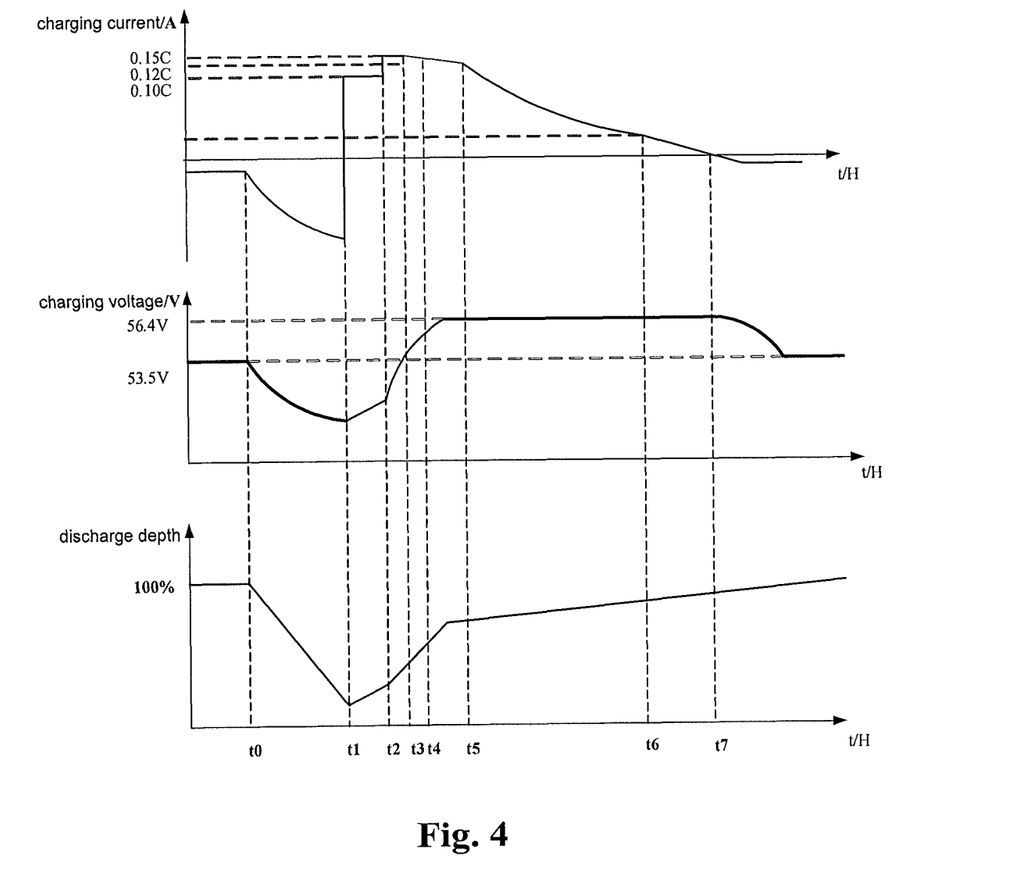
FIG. 4 is a schematic diagram of another charging curve of a charging management method of an embodiment of the present invention.

FIG. 4 is a schematic diagram of another charging curve of a charging management method of an embodiment of the present invention. It will be described hereinafter with reference to the drawing and the embodiment.

With a certain communication base station as the example, the station, with the load of 120 A, is provided with a battery of 500 AH, and six rectifier modules, each of which is 50 A. By monitoring, the charging current ratio of the storage battery is manually set as 0.15/H, the temperature compensation coefficient of battery charging current ratio as 0.01/H, the reference temperature as 25, the equalizing charging voltage as 56.4V, the floating charging voltage as 53.5V, the battery equalizing charging threshold capacity as 20%, the quick charging threshold as 35%, the holding current at the final stage of equalizing charging as 0.015 C. The specific process is as follows:

At t0, the supply of commercial power is interrupted, the storage battery starts to discharge, the battery voltage starts to drop, and the capacity starts to decrease.

At t1, the supply of commercial power is recovered, it is switched to that the commercial power provides electricity to load. As the storage battery is discharged greatly and the discharge depth of the storage battery is greater than the preset battery equalizing charging threshold capacity, the storage battery is first charged in the constant-current charging mode with an automatically turned-down charging current, and the value of the charging current is 0.10 C.

At t2, the battery voltage rises to the quick charging threshold, the charging process enters the quick charging stage, and at this time, the battery temperature is 20 which does not reach the reference temperature 25, therefore the charging current is adjusted to the current limiting value 0.15 C to quickly charge the storage battery, the battery voltage rises quickly and the battery capacity also increases quickly.

At t3, the battery temperature rises to 25, and the actual charging current is still at the set current limiting value 0.15 C; after t3, the battery temperature rises and exceeds the reference temperature, for example, at t4, the temperature rises to 26, and at this time, $\Delta C_{oef}=(26-25)*0.01=0.01$, and due to $\Delta C_{oef} \leq 0.5*C_{oef}=0.075$, the charging current $I=0.15$ C$-(26-25)*0.01*C$ is 0.14 C; with the charging going on, the temperature of the storage battery rises continuously, for example, rises to 27, and at this time, the charging current is 0.13 C. In the embodiment, the introduction of the temperature adjustment cannot decrease the temperature of the storage battery, but can slow down the speed of the rise of the temperature.

At t5, the temperature of the storage battery rises to 28, and at this moment, the charging current is 0.12 C, the battery voltage rises to the preset equalizing charging voltage value 56.4V, the constant-voltage charging mode is actuated, the battery current becomes smaller and smaller, and the battery capacity is close to the full capacity and rises slowly.

At t6, the battery current is lower than the holding current 0.015 C at the final stage of the equalizing charging, and at this moment, the charging process enters the equalizing charging holding stage.

At t7, the equalizing charging holding stage of the battery ends, and the charging process turns into floating charging automatically.

From the above embodiment, it can be known that the staged charging method realizes the automatic charging of the storage battery safely, quickly and effectively and also prolongs the service life of the storage battery, and refined maintenance and management for the battery are really achieved.

Figure 5:
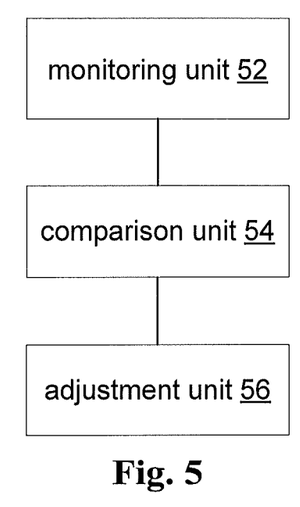
FIG. 5 is a block diagram of a structure of a charging management apparatus according to an embodiment of the present invention.

FIG. 5 is a block diagram of a structure of a charging management apparatus according to an embodiment of the present invention. As shown in FIG. 5, the apparatus comprises:

a monitoring unit 52, which is configured to monitor discharge capacity of a storage battery, and determine discharge depth of the storage battery according to the discharge capacity and total capacity of the storage battery; a comparison unit 54 coupled to the monitoring unit 52, and configured to compare the discharge depth of the storage battery determined by the monitoring unit with a preset battery equalizing charging threshold; an adjustment unit 56 coupled to the comparison unit 54, and configured to actuate a temperature-control charging mode to charge the storage battery when the discharge depth of the storage battery is greater than or equal to the preset battery equalizing charging threshold, wherein the temperature-control charging mode is to adjust charging current according to the temperature of the battery.

In this embodiment, under the situation that the discharge depth of the storage battery is relatively great, a temperature-control charging mode is used to charge the storage battery, thus avoiding the problem that the temperature of the storage battery is too high due to the excessive current when the remaining capacity of the battery is relatively low, so the service life of the storage battery is prolonged.

In addition, before adjusting the charging current according to the battery temperature to charge the storage battery, the adjustment unit 56 is further configured to actuate a constant-current charging mode to charge the storage battery until the battery capacity reaches the preset quick charging threshold, wherein the charging current of the constant-current charging mode is determined according to the discharge depth.

At the early stage of charging, a turned-down charging current is used for constant-current charging, thus avoiding the problem that the lead sulfate attached on the battery plate falls off due to the relatively large charging current at the early stage of charging, so the damage of the storage battery is reduced.

After adjusting the charging current according to the battery temperature to charge the storage battery, the adjustment unit 56 is further configured to actuate a constant-voltage charging mode to charge the storage battery when the battery voltage reaches a preset equalizing charging voltage value.

At the late stage of charging, current is mostly used for electrolyzing water when the constant-current charging mode is used, which makes the interior pressure of the storage battery too high, thus the battery loses water. In this embodiment, at the late stage of charging, a constant-voltage charging mode is used to charge the storage battery, therefore the above problem is avoided, and the stability of the charging of the storage battery is improved.

Preferably, after comparing the discharge depth of the storage battery with the preset battery equalizing charging threshold capacity, the adjustment unit 56 is further configured to actuate a floating charging mode to charge the storage battery when the discharge depth of the storage battery is less than the preset battery equalizing charging threshold capacity.

In the embodiment, under the situation that the discharge depth is small, a floating charging mode is actuated, so the power consumption caused by the self-discharge of the storage battery can be compensated, thus the storage battery can be stably kept at its battery capacity.

In summary, under the situation that the discharge depth of the storage battery is relatively great, a temperature-control charging mode is used to charge the storage battery, thus avoiding the problem that the temperature of the storage battery is too high due to the excessive current when the remaining capacity of the battery is relatively low, so the service life of the storage battery is prolonged. Furthermore, during the process of charging the storage battery by the equalizing charging mode, an automatically turned-down constant-current charging mode is also used to charge the storage battery, which can avoid the problem that the lead sulfate attached to the battery plate falls off due to large charging current under the situation that the storage battery is discharged deeply, which will form irreversible vulcanization and influence the service life of the battery; and after a period of charging, namely, when the capacity of the storage battery reaches the preset quick charging threshold, when the lead sulfate on the surface of the plate is reduced, a relatively large current can be used to quickly charge the storage battery. During the quick charging process, a temperature-control charging mode in which the charging current is adjusted according to the battery temperature is used, and the introduction of the temperature adjustment can prevent the battery temperature from rising too high due to the large current, which will aggravate the corrosion of the plate and consume excessive water, thus the storage battery can be protected.

The above description is only to illustrate the preferred embodiments but not to limit the present invention. Various alternative and changes to the present invention are apparent to those skilled in the art. The scope defined by claims shall comprise any modification, equivalent substitution and improvement within the spirit and principle of the present invention.

The invention claimed is:

1. A charging management method for a storage battery, comprising the following steps executed by a hardware processor:

monitoring discharge capacity of a storage battery, and determining discharge depth of the storage battery according to the discharge capacity and total capacity of the storage battery;

comparing the discharge depth of the storage battery with a preset battery equalizing charging threshold; and when the discharge depth of the storage battery is greater than or equal to the preset battery equalizing charging threshold, actuating a temperature-control charging mode to charge the storage battery, wherein the temperature-control charging mode is to adjust charging current according to the temperature of the battery.

2. The method according to claim 1, wherein, before actuating a temperature-control charging mode to charge the storage battery, the method further comprises:

the hardware processor actuating a constant-current charging mode to charge the storage battery, wherein the charging current of the constant-current charging mode is determined according to the discharge depth.

3. The method according to claim 2, wherein, determining the charging current of the constant-current charging mode according to the discharge depth comprises:
the hardware processor acquiring a charging current ratio adjustable factor corresponding to the discharge depth from a pre-saved corresponding relation between the discharge depth and the charging current ratio adjustable factor;
the hardware processor acquiring the automatically turned-down charging current $C*C_{oef}-C*\Delta C_{oef}$;
wherein, $C_{oef}$ is the charging current ratio, C is the total capacity of the storage battery, and $\Delta C_{oef}$ is the charging current ratio adjustable factor.

4. The method according to claim 2, wherein, after actuating a temperature-control charging mode to charge the storage battery, the method further comprises:
when the voltage of the storage battery reaches the preset equalizing charging voltage value, the hardware processor actuating a constant-voltage charging mode to charge the storage battery.

5. The method according to claim 2, wherein, in actuating a temperature-control charging mode to charge the storage battery:
when the temperature of the storage battery is less than or equal to T, the value of the charging current is $C*C_{oef}$;
when the temperature of the storage battery is greater than T and less than or equal to $$\frac{C_{oef}}{2BatCoef}+T,$$

the value of the charging current is $C*C_{oef}-C*(t_{bat}-T)*BatCoef$;
when the temperature of the storage battery is greater than or equal to $$\frac{C_{oef}}{2BatCoef}+T,$$

the value of the charging current is $0.5\,C_{oef}*C$;
wherein, T is reference temperature, $t_{bat}$ is the temperature of the storage battery, $C_{oef}$ is charging current ratio, C is the total capacity of the storage battery, and BatCoef is temperature compensation coefficient of the charging current ratio.

6. The method according to claim 1, wherein, after actuating a temperature-control charging mode to charge the storage battery, the method further comprises:
when the voltage of the storage battery reaches the preset equalizing charging voltage value, the hardware processor actuating a constant-voltage charging mode to charge the storage battery.

7. The method according to claim 1, wherein, in actuating a temperature-control charging mode to charge the storage battery:
when the temperature of the storage battery is less than or equal to T, the value of the charging current is $C*C_{oef}$;
when the temperature of the storage battery is greater than T and less than or equal to $$\frac{C_{oef}}{2BatCoef}+T,$$

the value of the charging current is $C*C_{oef}-C*(t_{bat}-T)*BatCoef$;
when the temperature of the storage battery is greater than or equal to $$\frac{C_{oef}}{2BatCoef}+T,$$

the value of the charging current is $0.5\,C_{oef}*C$;
wherein, T is reference temperature, $t_{bat}$ is the temperature of the storage battery, $C_{oef}$ is charging current ratio, C is the total capacity of the storage battery, and BatCoef is temperature compensation coefficient of the charging current ratio.

8. The method according to claim 1, wherein, after comparing the discharge depth of the storage battery with a preset battery equalizing charging threshold capacity, the method further comprises:
when the discharge depth of the storage battery is less than the preset battery equalizing charging threshold capacity, the hardware processor actuating a floating charging mode to charge the storage battery.

9. A charging management apparatus for a storage battery, comprising:
a monitoring unit, configured to monitor discharge capacity of a storage battery, and determine discharge depth of the storage battery according to the discharge capacity and total capacity of the storage battery;
a comparison unit, configured to compare the discharge depth of the storage battery determined by the monitoring unit with a preset battery equalizing charging threshold; and
an adjustment unit, configured to actuate a temperature-control charging mode to charge the storage battery when the discharge depth of the storage battery is greater than or equal to the preset battery equalizing charging threshold, wherein the temperature-control charging mode means is to adjust charging current according to the temperature of the battery.

10. The apparatus according to claim 9, wherein, before actuating a temperature-control charging mode to charge the storage battery, the adjustment unit is further configured to actuate a constant-current charging mode to charge the storage battery, and the charging current in the constant-current charging mode is determined according to the discharge depth.

11. The apparatus according to claim 10, wherein, after actuating a temperature-control charging mode to charge the storage battery, the adjustment unit is further configured to actuate a constant-voltage charging mode to charge the storage battery when the voltage of the storage battery reaches a preset equalizing charging voltage value.

12. The apparatus according to claim 10, wherein, after comparing the discharge depth of the storage battery with the preset battery equalizing charging threshold capacity, the adjustment unit is further configured to actuate a floating charging mode to charge the storage battery when the discharge depth of the storage battery is less than the preset battery equalizing charging threshold capacity.

13. The apparatus according to claim 9, wherein, after actuating a temperature-control charging mode to charge the storage battery, the adjustment unit is further configured to actuate a constant-voltage charging mode to charge the storage battery when the voltage of the storage battery reaches a preset equalizing charging voltage value.

14. The apparatus according to claim 9, wherein, after comparing the discharge depth of the storage battery with the preset battery equalizing charging threshold capacity, the adjustment unit is further configured to actuate a floating charging mode to charge the storage battery when the discharge depth of the storage battery is less than the preset battery equalizing charging threshold capacity.

* * * * *